United States Patent
Sung

(10) Patent No.: US 12,080,924 B2
(45) Date of Patent: Sep. 3, 2024

(54) POWER CONTROL SYSTEM AND METHOD OF A FUEL CELL

(71) Applicants: Hyundai Motor Company, Seoul (KR); Kia Corporation, Seoul (KR)

(72) Inventor: Byung Jun Sung, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/813,640

(22) Filed: Jul. 20, 2022

(65) Prior Publication Data

US 2023/0178770 A1 Jun. 8, 2023

(30) Foreign Application Priority Data

Dec. 8, 2021 (KR) .......................... 10-2021-0174881

(51) Int. Cl.
*H01M 8/04537* (2016.01)
*H01M 8/04858* (2016.01)
*H01M 16/00* (2006.01)

(52) U.S. Cl.
CPC ... *H01M 8/04552* (2013.01); *H01M 8/04888* (2013.01); *H01M 8/04932* (2013.01);
(Continued)

(58) Field of Classification Search
CPC .......................... H01M 8/04298–04303; H01M 8/04537–04626; H01M 8/04858–04947;
(Continued)

(56) References Cited

U.S. PATENT DOCUMENTS 10,693,164 B2 6/2020 Seo
2004/0048119 A1 3/2004 Iwase
(Continued)

FOREIGN PATENT DOCUMENTS

CN 110254296 A * 9/2019 .............. B60L 58/40
KR 10-1198667 2/2012
(Continued)

OTHER PUBLICATIONS

Machine translation of Luo, CN-110254296-A. Originally available Sep. 20, 2019. (Year: 2019).*

*Primary Examiner* — Jonathan Crepeau
*Assistant Examiner* — Jacob Buchanan
(74) *Attorney, Agent, or Firm* — MCDONNELL BOEHNEN HULBERT & BERGHOFF LLP

(57) ABSTRACT

Disclosed is a power control system and method of a fuel cell including a fuel cell that generates electricity; a load device that is electrically connected to the fuel cell; a DC/DC converter that is disposed between the fuel cell and the load device, and converts power between a low side of the DC/DC converter electrically connected to the fuel cell and a high side of the DC/DC converter electrically connected to the load device; a battery that is electrically connected to the high side of the DC/DC converter in parallel with the load device; and a controller that monitors a voltage of the high side of the DC/DC converter or a voltage of the low side of the DC/DC converter, and controls output power of the fuel cell or power consumption of the load device based on the monitored voltage of the high side or the monitored voltage of the low side.

12 Claims, 7 Drawing Sheets

(52) U.S. Cl.
CPC ..... *H01M 8/0494* (2013.01); *H01M 8/04947* (2013.01); *H01M 16/006* (2013.01); *H01M 2250/20* (2013.01)

(58) Field of Classification Search
CPC ......... B60L 50/50–75; B60L 58/00–15; B60L 58/30–40
See application file for complete search history.

(56) References Cited

U.S. PATENT DOCUMENTS

| | | | |
|---|---|---|---|
| 2006/0102397 A1 | 5/2006 | Buck | |
| 2008/0311452 A1* | 12/2008 | Takada | H01M 8/04552 429/432 |
| 2014/0292084 A1* | 10/2014 | Corson | H01M 8/04559 307/52 |

FOREIGN PATENT DOCUMENTS

| | | |
|---|---|---|
| KR | 10-2013-0105377 A | 9/2013 |
| KR | 10-1480991 | 1/2015 |
| KR | 10-1551086 B1 | 9/2015 |
| KR | 10-1807124 | 12/2017 |
| KR | 20190051329 A | 5/2019 |

\* cited by examiner

POWER CONTROL SYSTEM AND METHOD OF A FUEL CELL

CROSS REFERENCE TO RELATED APPLICATIONS

The present application claims priority to Korean Patent Application No. 10-2021-0174881, filed Dec. 8, 2021, the entire contents of which is incorporated herein for all purposes by this reference.

TECHNICAL FIELD

The present disclosure relates to a power control system and method of a fuel cell which maintains a voltage of a power circuit of a fuel cell to which a fuel cell stack, a battery, and a load device are connected at a predetermined level.

BACKGROUND

A fuel cell is a type of power generation device that directly converts chemical energy generated by oxidation of fuel into electrical energy. It is basically the same as a chemical cell in that it uses oxidation and reduction reactions, but unlike a chemical cell in which the cell reaction is carried out inside a closed system, there is a difference that the reactants are continuously supplied from the outside and the reaction products are continuously removed to the outside of the system. Recently, a fuel cell power generation system has been used put to practical use, and since the reaction product of the fuel cell is pure water, research for using it as an energy source for an eco-friendly vehicle is being actively conducted.

The fuel cell system includes a fuel cell stack that generates electrical energy through a chemical reaction, an air supply device that supplies air to a cathode of the fuel cell stack, and a fuel supply device that supplies hydrogen to a hydrogen electrode of the fuel cell stack. That is, air containing oxygen is supplied to the cathode of the fuel cell stack, and hydrogen is supplied to the anode of the fuel cell stack.

A solid polymer fuel cell (proton exchange membrane/polymer electrolyte membrane fuel cell) generates electricity through a chemical reaction of oxygen and hydrogen and additionally generates heat and water. The chemical reaction formula of the solid polymer fuel cell is as follows.

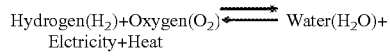

Hydrogen($H_2$)+Oxygen($O_2$) ⇌ Water($H_2O$)+ Elctricity+Heat

In the case of commercial vehicles that require high energy density due to their heavy weight and long mileage, it is difficult to meet the required performance of the vehicle with batteries alone, so a fuel cell system is emerging as a solution.

A high-capacity system adapted to the voltage range of a relatively high voltage is applied to the drive system of a commercial vehicle and other electrification systems, and the voltage range of the battery is also applied accordingly. However, in the case of a fuel cell, a stack that outputs a relatively low voltage is used, and a DC/DC converter is used to boost the output voltage of the fuel cell, in consideration of disadvantages in terms of packages due to the stack being increased to increase the output voltage and difficulties in common use of components.

In the DC/DC converter disposed between the fuel cell and the load device, the voltage of the high side must always be maintained higher than the voltage of the low side. Conversely, when a reverse phenomenon occurs in which the voltage of the high side becomes lower than the voltage of the low side, the current is bypassed from the low side to the high side as it is, causing damage to the DC/DC converter.

In particular, when the external temperature is low or the state of charge (SOC) of the battery is low, the output of the battery is lowered, thereby causing a problem in that the voltage of the battery is abruptly lowered when the vehicle is accelerated abruptly or a high output is requested.

The matters described as the background technology of the present disclosure are only for improving the understanding of the background of the present disclosure, and should not be taken as acknowledging that they correspond to the prior art already known to those of ordinary skill in the art.

SUMMARY

The present disclosure has been proposed to solve this problem, and the object of the present disclosure is to provide a power control system and method of a fuel cell that controls the power supply and consumption of a fuel cell, a battery, and a load device to prevent voltage reversal of a DC/DC converter disposed between the fuel cell and the load device.

In order to achieve the above object, a power control system of a fuel cell according to the present disclosure includes a fuel cell that generates electricity; a load device that is electrically connected to the fuel cell; a DC/DC converter that is disposed between the fuel cell and the load device, and converts power between a low side of the DC/DC converter electrically connected to the fuel cell and a high side of the DC/DC converter electrically connected to the load device; a battery that is electrically connected to the high side of the DC/DC converter in parallel with the load device; and a controller that monitors a voltage of the high side of the DC/DC converter or a voltage of the low side of the DC/DC converter, and controls output power of the fuel cell or power consumption of the load device based on the monitored voltage of the high side or the monitored voltage of the low side.

The controller may monitor the voltage of the high side, determine whether the monitored voltage of the high side is less than or equal to a preset limit voltage, and control the output power of the fuel cell or the power consumption of the load device according to the determination.

The controller may monitor the voltage of the high side and the voltage of the low side, determine a difference between the monitored voltage of the high side and the monitored voltage of the low side is less than or equal to a preset voltage difference, and controls the output power of the fuel cell or the power consumption of the load device according to the determination.

The controller may limit discharge power of the battery when the monitored voltage of the high side is less than or equal to a preset limit voltage, or a difference between the monitored voltage of the high side and the monitored voltage of the low side is less than or equal to a preset voltage difference.

The controller may primarily increase the output power of the fuel cell and, secondarily reduce the power consumption of the load device when it is impossible to further increase the output power of the fuel cell.

The controller may increase the output power of the fuel cell when the monitored voltage of the high side is less than or equal to a first limit voltage preset lower than a maximum allowable voltage of the DC/DC converter, or a difference between the monitored voltage of the high side and the monitored voltage of the low side is less than or equal to a preset first voltage difference.

The controller may reduce the power consumption of the load device when the monitored voltage of the high side is less than or equal to a second limit voltage preset lower than the preset first limit voltage, or the difference between the monitored voltage of the high side and the monitored voltage of the low side is less than or equal to a second voltage difference preset lower than the preset first voltage difference.

In order to achieve the above object, a power control method of a fuel cell according to the present disclosure includes the steps of converting, by a DC/DC converter, power between a low side of the DC/DC converter connected to a fuel cell and a high side of the DC/DC converter connected to a load device and a battery; monitoring a voltage of the high side of the DC/DC converter or a voltage of the low side of the DC/DC converter; and controlling output power of the fuel cell or power consumption of the load device based on the monitored voltage of the high side or the monitored voltage of the low side.

In the monitoring step, the voltage of the high side is monitored, and the method further includes, after the monitoring step, the step of determining whether the monitored voltage of the high side is less than or equal to a preset limit voltage, and in the controlling step, the output power of the fuel cell or the power consumption of the load device may be controlled according to the determination.

In the monitoring step, the voltage of the high side and the voltage of the low side are monitored, and the method further includes, after the monitoring step, the step of determining whether a difference between the monitored voltage of the high side and the monitored voltage of the low side is less than or equal to a preset voltage difference, and in the controlling step, the output power of the fuel cell or the power consumption of the load device may be controlled according to the determination.

In the controlling step, discharge power of the battery may be limited when the monitored voltage of the high side is less than or equal to a preset limit voltage, or a difference between the monitored voltage of the high side and the monitored voltage of the low side is less than or equal to a preset voltage difference.

In the controlling step, the output power of the fuel cell may be primarily increased and, the power consumption of the load device may be secondarily reduced when it is impossible to further increase the output power of the fuel cell.

The method further includes, after the monitoring step, the step of comparing the monitored voltage of the high side with a first limit voltage preset lower than a maximum allowable voltage of the DC/DC converter, or comparing a difference between the monitored voltage of the high side and the monitored voltage of the low side with a preset first voltage difference. In the controlling step, the output power of the fuel cell may be increased when the monitored voltage of the high side is less than or equal to the preset first limit voltage, or the difference between the monitored voltage of the high side and the monitored voltage of the low side is less than or equal to the preset first voltage difference.

The method further includes, after the monitoring step, the step of comparing the monitored voltage of the high side with a second limit voltage preset lower than the preset first limit voltage, or comparing the difference between the monitored voltage of the high side and the monitored voltage of the low side with a second voltage different preset lower than the preset first voltage difference. In the controlling step, the power consumption of the load device may be reduced when the monitored voltage of the high side is less than or equal to the preset second limit voltage, or the difference between the monitored voltage of the high side and the monitored voltage of the low side is less than or equal to the preset second voltage difference.

According to the power control system and method of a fuel cell of the present disclosure, it can prevent the voltage on the high side of the DC/DC converter from exceeding the maximum allowable voltage of the DC/DC converter while preventing the voltage reversal from occurring in the DC/DC converter.

Accordingly, it is possible to improve the durability of the DC/DC converter and to prevent failure of expensive electric components in advance.

DETAILED DESCRIPTION

Figure 1:
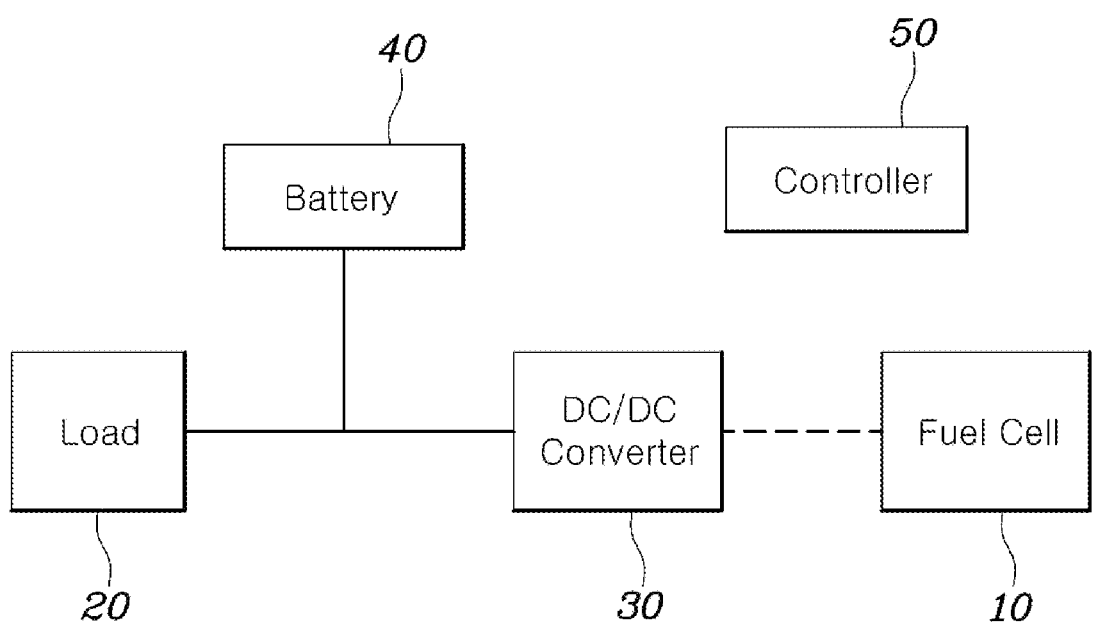
FIG. 1 is a configuration diagram of a power control system of a fuel cell according to an embodiment of the present disclosure.

Specific structural or functional descriptions of the embodiments of the present disclosure disclosed in the present specification or application are only exemplified for the purpose of describing the embodiments according to the present disclosure, and the embodiments according to the present disclosure may be implemented in various forms and should not be construed as being limited to the embodiments described in the present specification or application.

Since the embodiment according to the present disclosure can have various changes and various forms, specific embodiments are illustrated in the drawings and described in detail in the present specification or application. However, this is not intended to limit the embodiment according to the concept of the present disclosure with respect to a specific disclosed form, and should be understood to include all changes, equivalents or substitutes included in the spirit and scope of the present disclosure.

Terms such as first and/or second may be used to describe various elements, but the elements should not be limited by the terms. The above terms are used only for the purpose of distinguishing one element from another. For example, without departing from the scope of the present disclosure, a first element may be called a second element, and similarly the second component may also be referred to as the first component.

When a component is referred to as being "connected" or "contacted" to another component, it may be directly connected or contacted to the other component, but it should be understood that other components may exist in between. On the other hand, when it is mentioned that a certain element is "directly connected" or "directly contacted" to another element, it should be understood that no other element is present in the middle. Other expressions describing the relationship between elements, such as "between" and "immediately between" or "adjacent to" and "directly adjacent to", etc., should be interpreted similarly.

The terms used herein are used only to describe specific embodiments, and are not intended to limit the present disclosure. The singular expression includes the plural expression unless the context clearly dictates otherwise. In the present specification, terms such as "comprise" or "have" are intended to designate that the described feature, number, step, operation, component, part, or a combination thereof exists, and it should be understood that it does not preclude the possibility of the existence or addition of one or more other features, numbers, steps, operations, elements, parts, or combinations thereof in advance.

Unless defined otherwise, all terms used herein, including technical and scientific terms, have the same meaning as commonly understood by one of ordinary skill in the art to which the present disclosure belongs. Terms such as those defined in commonly used dictionaries should be interpreted as having meanings consistent with the context of the related art, and unless explicitly defined in the present specification, they are not to be interpreted in an ideal or excessively formal meaning.

Hereinafter, the present disclosure will be described in detail by describing preferred embodiments of the present disclosure with reference to the accompanying drawings. Like reference numerals in each figure indicate like elements.

FIG. 1 is a configuration diagram of a power control system of a fuel cell 10 according to an embodiment of the present disclosure.

Referring to FIG. 1, a power control system of a fuel cell 10 according to an embodiment of the present disclosure includes a fuel cell 10 that generates electricity; a load device 20 that is electrically connected to the fuel cell 10; a DC/DC converter 30 that is disposed between the fuel cell 10 and the load device 20, and converts power between a low side 32 of the DC/DC converter 30 electrically connected to the fuel cell 10 and a high side 31 of the DC/DC converter 30 electrically connected to the load device 20; a battery 40 that is electrically connected to the high side 31 of the DC/DC converter 30 in parallel with the load device 20; and a controller 50 that monitors the voltage of the high side 31 of the DC/DC converter 30 or the voltage of the low side 32 of the DC/DC converter 30, and controls the output power of the fuel cell 10 or the power consumption of the load device 20 based on the monitored voltage of the high side 31 or the monitored voltage of the low side 32.

The fuel cell 10 may be a fuel cell stack 10 in which a plurality of cells is stacked, and each cell included in the fuel cell stack 10 can generate electricity by receiving hydrogen through an anode and air containing oxygen through a cathode.

The fuel cell stack 10 may include a membrane-electrode assembly (MEA) therein.

The load device 20 is a power consuming device electrically connected to the fuel cell 10, and may receive power generated from the fuel cell 10. In particular, the load device 20 receives most of required power from the fuel cell 10, and the battery 40 serves as an energy buffer to supplement insufficient power or store surplus power.

In one embodiment, the load device 20 may be a driving motor of a vehicle, an air blower or an air compressor for supplying air to the fuel cell stack 10, or a cooling pump for supplying a coolant to cool the fuel cell stack 10, or a power consuming device such as a COD resistor.

In particular, the load device 20 may be a device of a large-capacity system applied to a commercial vehicle, and accordingly, the operating voltage of the load device 20 may be relatively higher than the output voltage of the fuel cell 10.

The battery 40 is electrically connected to the high side 31 of the DC/DC converter 30, and, in particular, is connected in parallel with the load device 20 on the high side 31, so that it can be electrically connected to the fuel cell 10. Accordingly, the battery 40 may supplement the power output from the fuel cell 10 and supplied to the load device 20, or may store surplus power.

The battery 40 is composed of a plurality of cells to charge or discharge power. Also, in the battery 40 electrically connected to the high side 31, the input voltage or the output voltage may be relatively higher than the output voltage of the fuel cell 10.

Figure 2:
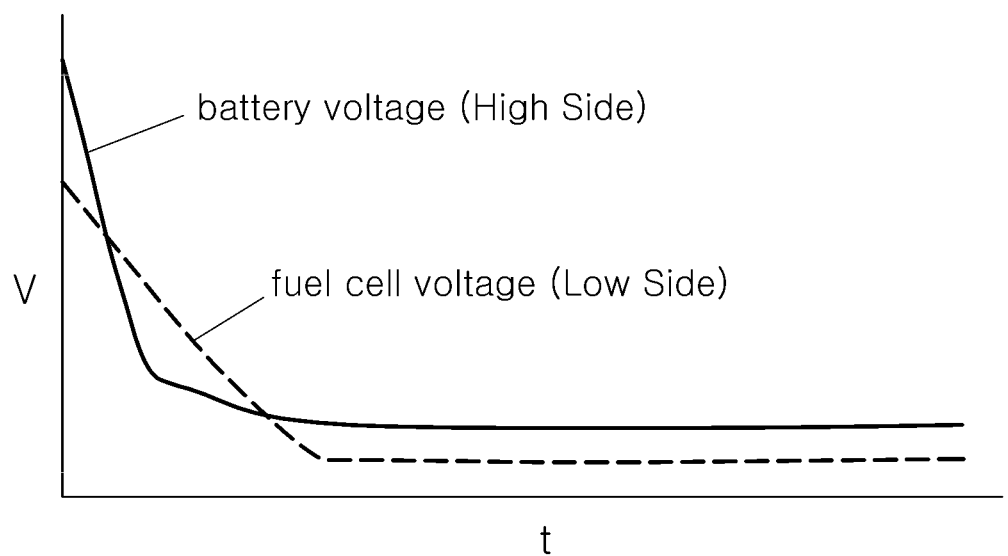
FIG. 2 shows a change in voltage when a voltage reversal of a DC/DC converter occurs.

FIG. 2 shows a change in voltage when a voltage reversal of the DC/DC converter 30 occurs.

Referring further to FIG. 2, when the voltage reversal of the DC/DC converter 30 occurs, the voltage of the high side 31 becomes to be lower than the voltage of the low side 32 in the DC/DC converter 30. This is the case in which the output of the battery 40 is reduced in a state in which the load device 20 uses high output or the vehicle is rapidly accelerated. In particular, it may be a case where the temperature of the battery 40 is low due to a low outdoor temperature, or a state of charge (SOC) of the battery 40 is low. In this case, in a state in which the output power of the battery 40 is relatively low, as the discharge current increases, the discharge voltage of the battery 40 may rapidly decrease.

In this case, the controller 50 controls to increase the output power of the fuel cell 10 or to reduce the power consumption of the load device 20, so that it can prevent the voltage of the low side 32 of the DC/DC converter 30 from being lowered.

Figure 3:
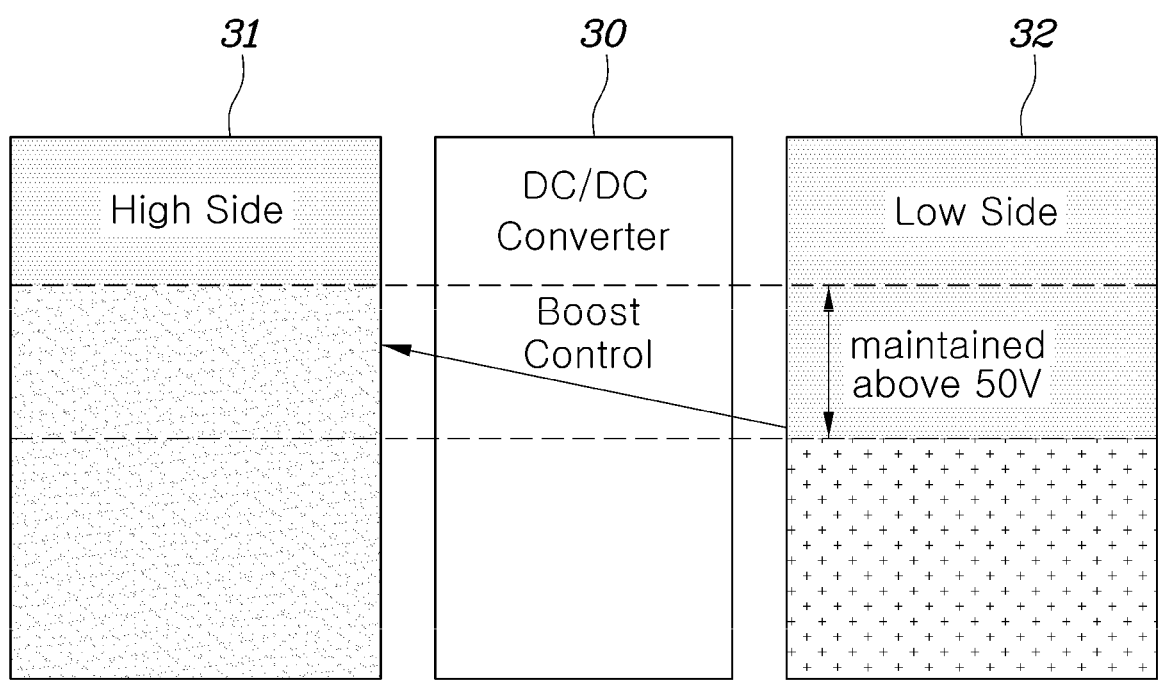
FIG. 3 shows a normal converting of a DC/DC converter according to an embodiment of the present disclosure.
Figure 4:
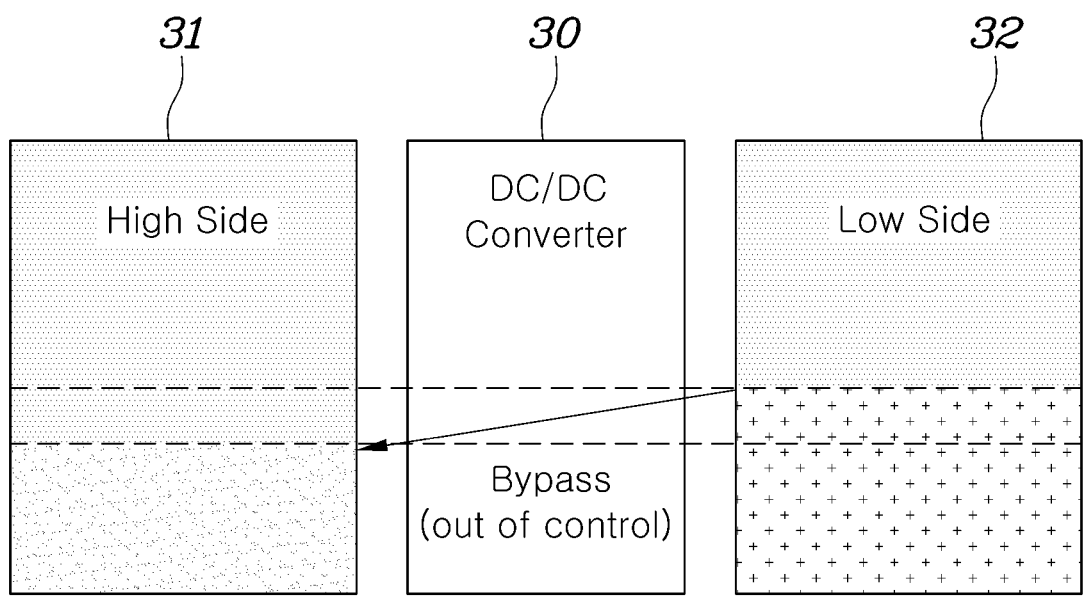
FIG. 4 shows a converting of a reverse phenomenon of a DC/DC converter according to an embodiment of the present disclosure.

FIG. 3 shows the normal converting of the DC/DC converter 30 according to an embodiment of the present disclosure, and FIG. 4 shows the converting of the reverse phenomenon of the DC/DC converter 30 according to an embodiment of the present disclosure.

Referring further to FIGS. 3 to 4, the DC/DC converter 30 is disposed between the fuel cell 10 and the load device 20 and may boost the voltage of the low side 32 electrically connected to the fuel cell 10, which is a relatively low voltage, and supply it to the high side 31 electrically connected to the load device 20.

The voltage of the high side 31 of the DC/DC converter 30 should always be maintained at least 50 [V] higher than the voltage of the low side 32.

However, as shown in FIG. 3, when a reverse phenomenon in which the voltage of the low side 32 becomes higher than the voltage of the high side 31 occurs, the current that flows from the low side 32 to the high side 31 is bypassed as it is, without being controlled. Thus, when excessive current flows, the DC/DC converter 30 may be damaged.

The controller 50 according to an exemplary embodiment of the present disclosure may be implemented through a non-volatile memory (not shown) configured to store an algorithm configured to control the operation of various components of a vehicle or the data relating to software instructions for reproducing the algorithm, and a processor (not shown) configured to perform operations described below using the data stored in the corresponding memory. Here, the memory and the processor may be implemented as separate chips. Alternatively, the memory and processor may be implemented as a single chip integrated with each other, and the processor may take the form of one or more processors.

The controller 50 may monitor the voltage of the high side 31 or low side 32 of the DC/DC converter 30. In particular, the controller 50 may monitor the voltage of the load device 20 or the voltage of the battery 40 in real time, receive voltage information from the device that monitors the voltage of the load device 20 or the voltage of the battery 40, or be connected to the DC/DC converter 30 to monitor the voltage of the high side 31. Here, the voltage of the load device 20, the voltage of the battery 40, and the voltage of the high side 31 of the DC/DC converter 30 may all be assumed to be the same.

In addition, the controller 50 may monitor the output voltage of the fuel cell 10 in real time, receive voltage information from the device that monitors the output voltage of the fuel cell 10, or be connected to the DC/DC converter 30 to monitor the voltage of the low side 32. Here, the output voltage of the fuel cell 10 may be assumed to be the same as the voltage of the low side 32 of the converter.

The controller 50 may control the output power of the fuel cell 10 or the power consumption of the load device 20 based on the monitored voltage of the high side 31 or the monitored voltage of the low side 32.

In one embodiment, the controller 50 may monitor the voltage of the high side 31, determine whether the monitored voltage of the high side 31 is less than or equal to a preset limit voltage, and control the output power of the fuel cell 10 or the power consumption of the load device 20 according to the determination.

Here, the preset limit voltage may be preset as the maximum voltage of the fuel cell 10 electrically connected to the low side 32 of the DC/DC converter 30. That is, the preset limit voltage may be preset to a voltage that is likely to be lower than the voltage of the low side 32 of the DC/DC converter 30.

Specifically, the controller 50 compares the monitored voltage of the high side 31 with the preset limit voltage, and when the monitored voltage of the high side 31 is less than or equal to the preset limit voltage, the controller 50 may control the output power of the battery 40 or the power consumption of the load device 20.

In one embodiment, the controller 50 may decrease the voltage of the low side 32 by increasing the output power of the fuel cell 10, or increase the voltage of the high side 31 by reducing the power consumption of the load device 20.

Here, as the output current of the fuel cell 10 is increased, the output power may be increased, and when the output current of the fuel cell 10 is increased, the output voltage of the fuel cell 10 may be decreased.

In another embodiment, the controller 50 may monitor the voltage of the high side 31 and the voltage of the low side 32, determine whether a difference between the monitored voltage of the high side 31 and the monitored voltage of the low side 32 is less than or equal to a preset voltage difference, and control the output power of the fuel cell 10 or the power consumption of the load device 20 according to the determination.

Here, the preset voltage difference may be preset as the minimum voltage difference to be maintained between the voltage of the high side 31 and the voltage of the low side 32 for the converting of the DC/DC converter 30. For example, it may be preset to 50 [V].

In one embodiment, the controller 50 may limit the discharge power of the battery 40 when the monitored voltage of the high side 31 is less than or equal to a preset limit voltage, or the difference between the monitored voltage of the high side 31 and the monitored voltage of the low side 32 is less than or equal to a preset voltage difference.

That is, the controller 50 may limit the discharge power of the battery 40 in order to prevent a phenomenon in which the output voltage of the battery 40 abruptly drops due to the rapid discharge of the battery 40.

As will be described later, since the power consumption of the load device 20 is the sum of the output power of the fuel cell 10 and the discharge power of the battery 40, the controller 50 may increase the output power of the fuel cell 10 or reduce the power consumption of the load device 20 while limiting the discharge power of the battery 40.

Figure 5:
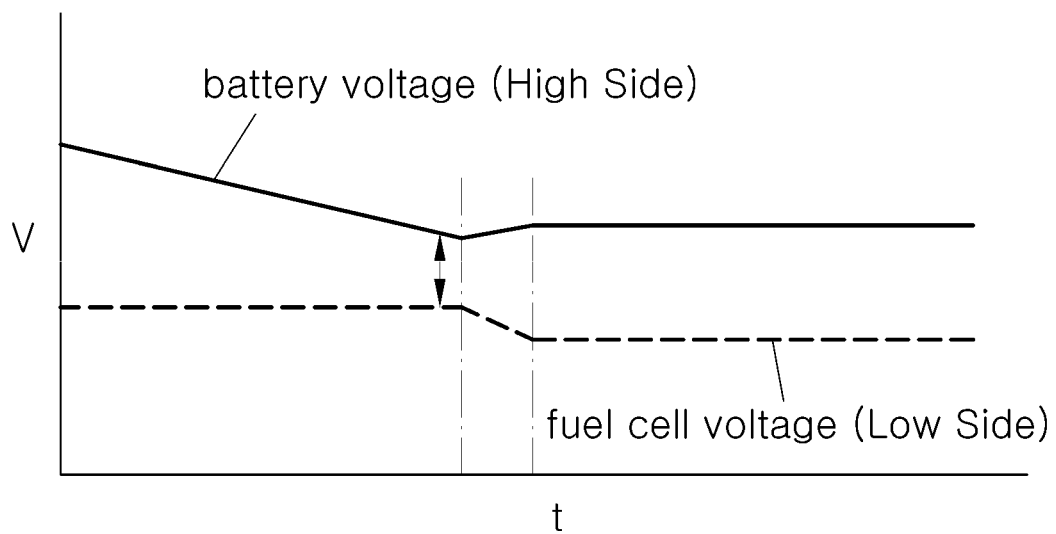
FIG. 5 shows a change in voltage of a power control system of a fuel cell according an embodiment of the present disclosure.
Figure 6:
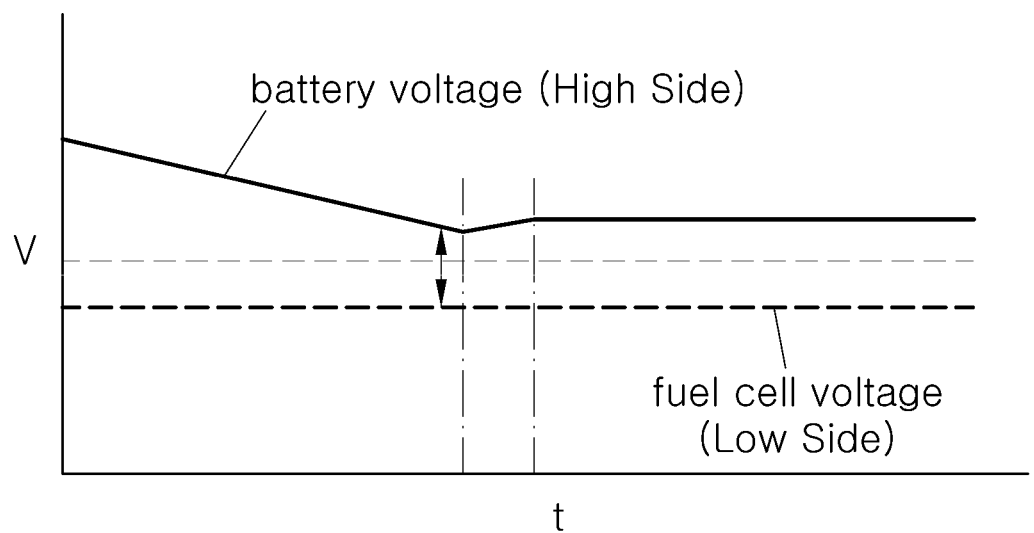
FIG. 6 shows a change in voltage of a power control system of a fuel cell according another embodiment of the present disclosure.

FIGS. 5 and 6 show a change in voltage of the power control system of the fuel cell 10 according to various embodiments of the present disclosure.

Referring further to FIGS. 5 and 6, the controller 50 may primarily increase the output power of the fuel cell 10 as shown in FIG. 5, and may secondarily reduce the power consumption of the load device 20, as shown in FIG. 6, when it is impossible to further increase the output power of the fuel cell 10.

In particular, as shown in FIG. 5, when the discharge power of the battery 40 is limited while increasing the output power of the fuel cell 10, the voltage of the high side 31 of the DC/DC converter 30 increases, as well as the voltage of the low side 32 decreases at the same time. Accordingly, the voltage reversal of the DC/DC converter 30 can be effectively prevented.

However, such control is impossible when the output power of the fuel cell 10 is the maximum or the output power cannot be increased. Accordingly, as shown in FIG. 6, the controller 50 limits the discharge power of the battery 40 while reducing the power consumption of the load device 20, and accordingly the voltage of the high side 31 can be increased.

In another embodiment, the controller 50 may increase the output power of the fuel cell 10 when the monitored voltage of the high side 31 is less than or equal to a first limit voltage preset lower than the maximum allowable voltage of the DC/DC converter 30, or the voltage difference between the monitored voltage of the high side 31 and the monitored voltage of the low side 32 is less than or equal to a preset first voltage difference.

Here, the preset first limit voltage may be preset as the maximum value of the output voltage of the fuel cell 10, and the preset first voltage difference may be preset to be greater than the minimum voltage difference that has to be maintained between the voltage of the high side 31 and the voltage of the low side 32 for the converting of the DC/DC converter 30, which may be preset to 100 [V], for example.

In this case, by increasing the output power of the fuel cell 10 while maintaining the power consumption of the load device 20 in a state in which the possibility that the voltage reversal of the DC/DC converter 30 will occur is relatively low, the discharge power of the battery 40 may be decreased.

In addition, the controller 50 may reduce the power consumption when the monitored voltage of the high side 31 is lower than a second limit voltage preset lower than the preset first limit voltage or the difference between the monitored voltage of the high side 31 and the monitored voltage of the low side is less than or equal to a second voltage difference preset lower than the preset first voltage difference.

Here, the preset first limit voltage may be preset as the minimum value of the operating voltage of the load device 20, and the preset first voltage difference may be preset as the minimum voltage difference to be maintained between the voltage of the high side 31 and the voltage of the low side 32 for the converting of DC/DC convert 30, which may be preset to 50 [V], for example.

In this case, it is possible to reduce the discharge power of the battery 40 by limiting the power consumption of the load device 20 in a state in which the possibility that the voltage reversal of the DC/DC converter 30 will occur is relatively high.

Figure 7:
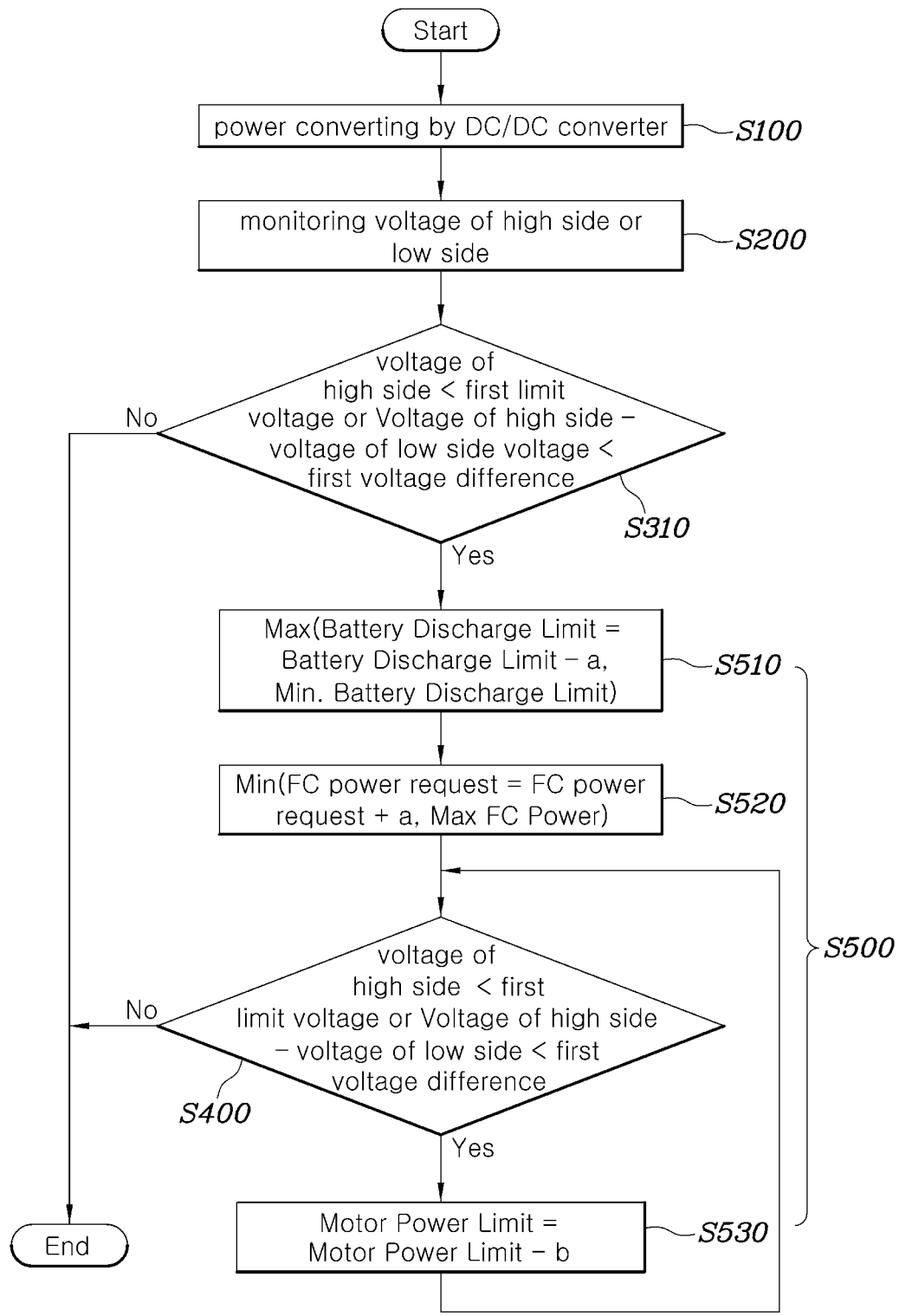
FIG. 7 is a flowchart of a power control method of a fuel cell 10 according to an embodiment of the present disclosure.

FIG. 7 is a flowchart of a power control method of the fuel cell 10 according to an embodiment of the present disclosure.

Referring further to FIG. 7, the power control method of the fuel cell 10 according to an embodiment of the present disclosure includes the steps of converting, by the DC/DC converter, power between the low side 32 of the DC/DC converter 30 connected to the fuel cell 10 and the high side 31 of the DC/DC converter 30 connected to the load device 20 and the battery 40 (S100); monitoring the voltage of the high side 31 of the DC/DC converter 30 or the voltage of the low side 32 of the DC/DC converter 30 (S200); and controlling the output power of the fuel cell 10 or the power consumption of the load device 20 based on the monitored voltage of the high side 31 or the monitored voltage of the low side 32(S500).

In the power converting step (S100), the DC/DC converter 30 may boost the power of the fuel cell 10 to continuously supply the power to the load device 20 and the battery 40.

In the monitoring step (S200), the voltage of the high side 31 is monitored, and after the monitoring step (S200), the step of determining whether the monitored voltage of the high side 31 is less than or equal to the preset limit voltage (S310, S400) is further included. In the controlling step (S500), the output power of the fuel cell 10 or the power consumption of the load device 20 can be controlled according to the determination.

In the monitoring step (S200), the voltage of the high side 31 and the voltage of the low side 32 are monitored. After the monitoring step (S200), the step of determining whether the difference between the monitored voltage of the high side 31 and the monitored voltage of the low side 32 is less than or equal to a preset voltage difference (S310, S400) is further included. In the controlling step (S500), the output power of the fuel cell 10 or the power consumption of the load device 20 may be controlled according to the determination.

In the controlling step (S500), when the monitored voltage of the high side 31 is less than or equal to a preset limit voltage, or the difference between the monitored voltage of the high side 31 and the monitored voltage of the low side 32 is less than or equal to a preset voltage difference, the discharge power of the battery 40 may be limited (S510).

In the controlling step (S500), the output power of the fuel cell 10 may be primarily increased (S520), and when it is impossible to further increase the output power of the fuel cell 10, the power consumption of the load device 20 may be secondarily reduced (S530).

After the monitoring step (S200), the step of comparing the monitored voltage of the high side 31 with a first limit voltage preset lower than the maximum allowable voltage of the DC/DC converter 30, or the difference between the monitored voltage of the high side 31 and the monitored voltage of the low side 32 with a preset first voltage difference (S310) is further included. In the controlling step (S500), when the monitored voltage of one high side 31 is less than or equal to the preset first limit voltage, or the difference between the monitored voltage of the high side 31 and the monitored voltage of the low side 32 is less than or equal to the preset first voltage difference, the output power of the fuel cell 10 may be increased (S520).

After the monitoring step (S200), the step of comparing the monitored voltage of the high side 31 with a second limit voltage preset lower than the preset first limit voltage, or the difference between the monitored voltage of the high side 31 and the monitored voltage of the low side 32 with a second voltage difference preset lower than the preset first voltage difference (S400) is further included. In the controlling step (S500), when the monitored voltage of the high side 31 is less than or equal to the preset second limit voltage, or the difference between the monitored voltage of the high side 31 and the monitored voltage of the low side 32 is less than or equal to the preset second voltage difference, the power consumption of the load device 20 may be reduced (S530).

Although the present disclosure has been shown and described with reference to specific embodiments, it will be apparent to those of ordinary skill in the art that the present disclosure can be variously improved and changed without departing from the spirit of the present disclosure provided by the following claims.

What is claimed is:

1. A power control system of a fuel cell comprising:
a fuel cell that generates electricity;
a load device that is electrically connected to the fuel cell;
a DC/DC converter that is disposed between the fuel cell and the load device, and converts power between a low side of the DC/DC converter electrically connected to the fuel cell and a high side of the DC/DC converter electrically connected to the load device;
a battery that is electrically connected to the high side of the DC/DC converter in parallel with the load device; and
a controller that monitors a voltage of the high side of the DC/DC converter or a voltage of the low side of the DC/DC converter, and controls output power of the fuel cell or power consumption of the load device based on the monitored voltage of the high side or the monitored voltage of the low side,
wherein the controller limits discharge power of the battery when the monitored voltage of the high side is less than or equal to a preset limit voltage, or a difference between the monitored voltage of the high side and the monitored voltage of the low side is less than or equal to a preset voltage difference, and
wherein the controller, while limiting the discharge power of the battery, (i) increases the output power of the fuel cell, and (ii) reduces the power consumption of the load device when it is impossible to further increase the output power of the fuel cell to thereby prevent a voltage reversal of the DC/DC converter.

2. The power control system of a fuel cell according to claim 1, wherein the controller monitors the voltage of the high side, determines whether the monitored voltage of the high side is less than or equal to a preset limit voltage, and controls the output power of the fuel cell or the power consumption of the load device according to the determination.

3. The power control system of a fuel cell according to claim 1, wherein the controller monitors the voltage of the high side and the voltage of the low side, determines a difference between the monitored voltage of the high side and the monitored voltage of the low side is less than or equal to a preset voltage difference, and controls the output power of the fuel cell or the power consumption of the load device according to the determination.

4. The power control system of a fuel cell according to claim 1, wherein the controller increases the output power of the fuel cell when the monitored voltage of the high side is less than or equal to a first limit voltage preset lower than a maximum allowable voltage of the DC/DC converter, or a difference between the monitored voltage of the high side and the monitored voltage of the low side is less than or equal to a preset first voltage difference.

5. The power control system of a fuel cell according to claim 4, wherein the controller reduces the power consumption of the load device when the monitored voltage of the high side is less than or equal to a second limit voltage preset lower than the preset first limit voltage, or the difference between the monitored voltage of the high side and the monitored voltage of the low side is less than or equal to a second voltage difference preset lower than the preset first voltage difference.

6. The power control system of a fuel cell according to claim 1, wherein the limited discharge power of the battery is greater than zero.

7. A power control method of a fuel cell comprising the steps of:
    converting, by a DC/DC converter, power between a low side of the DC/DC converter connected to a fuel cell and a high side of the DC/DC converter connected to a load device and a battery;
    monitoring a voltage of the high side of the DC/DC converter or a voltage of the low side of the DC/DC converter; and
    controlling output power of the fuel cell or power consumption of the load device based on the monitored voltage of the high side or the monitored voltage of the low side,
    wherein in the controlling step, discharge power of the battery is limited when the monitored voltage of the high side is less than or equal to a preset limit voltage, or a difference between the monitored voltage of the high side and the monitored voltage of the low side is less than or equal to a preset voltage difference, and
    wherein, in the controlling step, while limiting the discharge power of the battery, (i) increase the output power of the fuel cell, and (ii) reduce the power consumption of the load device when it is impossible to further increase the output power of the fuel cell to thereby prevent a voltage reversal of the DC/DC converter.

8. The power control method of a fuel cell according to claim 7, wherein in the monitoring step, the voltage of the high side is monitored, and
    wherein the method further comprises, after the monitoring step, determining whether the monitored voltage of the high side is less than or equal to a preset limit voltage, and in the controlling step, the output power of the fuel cell or the power consumption of the load device is controlled according to the determination.

9. The power control method of a fuel cell according to claim 7, wherein in the monitoring step, the voltage of the high side and the voltage of the low side are monitored, and
    wherein the method further comprises, after the monitoring step, determining whether a difference between the monitored voltage of the high side and the monitored voltage of the low side is less than or equal to a preset voltage difference, and in the controlling step, the output power of the fuel cell or the power consumption of the load device is controlled according to the determination.

10. The power control method of a fuel cell according to claim 7, further comprising, after the monitoring step, comparing the monitored voltage of the high side with a first limit voltage preset lower than a maximum allowable voltage of the DC/DC converter, or comparing a difference between the monitored voltage of the high side and the monitored voltage of the low side with a preset first voltage difference,
    wherein in the controlling step, the output power of the fuel cell is increased when the monitored voltage of the high side is less than or equal to the preset first limit voltage, or the difference between the monitored voltage of the high side and the monitored voltage of the low side is less than or equal to the preset first voltage difference.

11. The power control method of a fuel cell according to claim 10, further comprising, after the monitoring step, comparing the monitored voltage of the high side with a second limit voltage preset lower than the preset first limit voltage, or comparing the difference between the monitored voltage of the high side and the monitored voltage of the low side with a second voltage different preset lower than the preset first voltage difference,
    wherein in the controlling step, the power consumption of the load device is reduced when the monitored voltage of the high side is less than or equal to the preset second limit voltage, or the difference between the monitored voltage of the high side and the monitored voltage of the low side is less than or equal to the preset second voltage difference.

12. The power control method of a fuel cell according to claim 7, wherein the limited discharge power of the battery is greater than zero.

* * * * *